US012736663B2

(12) United States Patent
Pandharipande et al.

(10) Patent No.: US 12,736,663 B2
(45) Date of Patent: Sep. 15, 2026

(54) RADAR SYSTEM TRANSMITTER BEAMFORMING USING OCCUPANCY MAP DATA

(71) Applicant: NXP B.V., Eindhoven (NL)

(72) Inventors: Ashish Pandharipande, Eindhoven (NL); Nitin Jonathan Myers, Rozenburg (NL); Edoardo Focante, Delft (NL); Geethu Joseph, Delft (NL)

(73) Assignee: NXP B.V., Eindhoven (NL)

( * ) Notice: Subject to any disclaimer, the term of this patent is extended or adjusted under 35 U.S.C. 154(b) by 339 days.

(21) Appl. No.: 18/367,427

(22) Filed: Sep. 12, 2023

(65) Prior Publication Data

US 2025/0085414 A1 Mar. 13, 2025

(51) Int. Cl.
*G01S 13/87* (2006.01)
*G01S 7/02* (2006.01)
*G01S 7/03* (2006.01)
*G01S 13/58* (2006.01)

(52) U.S. Cl.
CPC ............ *G01S 13/878* (2013.01); *G01S 7/023* (2013.01); *G01S 7/032* (2013.01); *G01S 13/584* (2013.01)

(58) Field of Classification Search
CPC ...... G01S 13/931; G01S 13/584; G01S 13/89; G01S 7/4026; G01S 7/023; G01S 2013/0254
USPC .................................... 342/70, 81, 154, 354
See application file for complete search history.

(56) References Cited

U.S. PATENT DOCUMENTS 3,727,218 A * 4/1973 Cantwell, Jr. ......... G01S 7/2925 342/197
5,598,163 A 1/1997 Cornic et al.
6,894,642 B2 * 5/2005 Li ........................... H01Q 3/22 342/368
7,345,620 B2 * 3/2008 Voigtlaender ........... G01S 7/023 342/159
7,411,542 B2 * 8/2008 O'Boyle ................. G01S 7/414 342/72
8,358,239 B2 * 1/2013 Krich .................... G01S 7/2813 342/174
9,229,100 B2 * 1/2016 Lee .......................... G01S 7/28
9,825,360 B2 * 11/2017 Miller ...................... H04K 3/00
10,942,256 B2 * 3/2021 Achour .................... H01Q 3/36
11,005,179 B2 * 5/2021 Achour .................... H01Q 3/34
(Continued)

OTHER PUBLICATIONS

Lee, G., "Robust measurement validation for radar target tracking using prior information", IET Radar, Sonar and Navigation, Jul. 2019.
Li, F., "A waveform design method for suppressing range sidelobes in desired intervals", Elsevier, Signal Processing, Oct. 12, 2013.
(Continued)

*Primary Examiner* — Michael W Justice

(57) ABSTRACT

A device may include at least one transmitter unit and at least one receiver unit, wherein the at least one transmitter unit and the at least one receiver unit are configured to transmit and receive radar signals, wherein the at least one transmitter unit and the at least one receiver unit are co-located with a vehicle. A device may include a radar processor, configured to: determine an occupancy map, wherein the occupancy map identifies a location of an object with respect to the automotive radar system, determine, using the occupancy map, a beamforming weight vector w, and transmit, using the at least one transmitter unit, the radar signal using the beamforming weight vector w.

18 Claims, 7 Drawing Sheets

(56) References Cited

U.S. PATENT DOCUMENTS

| | | | | |
|---|---|---|---|---|
| 11,119,478 | B2 * | 9/2021 | McArthur | G01S 13/931 |
| 11,474,229 | B2 * | 10/2022 | Cottron | G01S 7/4026 |
| 11,988,741 | B2 * | 5/2024 | Somanath | G01S 13/931 |
| 12,340,967 | B2 * | 6/2025 | Sprenkle | G05B 19/4155 |
| 12,352,850 | B1 * | 7/2025 | Srivastav | G01S 17/89 |
| 2005/0073457 | A1 * | 4/2005 | Li | H01Q 3/26 342/368 |
| 2006/0109170 | A1 * | 5/2006 | Voigtlaender | G01S 13/931 342/159 |
| 2006/0267830 | A1 * | 11/2006 | O'Boyle | G01S 13/931 340/436 |
| 2011/0241931 | A1 * | 10/2011 | Krich | G01S 7/2813 342/159 |
| 2015/0084810 | A1 * | 3/2015 | Lee | G01S 13/4463 342/154 |
| 2015/0355313 | A1 | 12/2015 | Li et al. | |
| 2016/0211577 | A1 * | 7/2016 | Miller | H01Q 3/28 |
| 2018/0348343 | A1 * | 12/2018 | Achour | H01Q 1/364 |
| 2018/0351250 | A1 * | 12/2018 | Achour | H01Q 21/064 |
| 2019/0339376 | A1 * | 11/2019 | Levy-Israel | G01S 13/536 |
| 2020/0019160 | A1 * | 1/2020 | McArthur | G01S 7/52004 |
| 2020/0150259 | A1 * | 5/2020 | Cottron | G01S 13/726 |
| 2021/0257732 | A1 * | 8/2021 | Achour | H01Q 13/10 |
| 2022/0196830 | A1 * | 6/2022 | Somanath | G01C 21/3415 |
| 2023/0013095 | A1 * | 1/2023 | Sprenkle | G05B 19/4155 |
| 2023/0124953 | A1 * | 4/2023 | Kanemoto | H04W 72/541 455/63.1 |
| 2023/0269676 | A1 * | 8/2023 | Mandelli | G01S 13/003 370/318 |
| 2025/0076445 | A1 * | 3/2025 | Ashour | G01S 5/02526 |

OTHER PUBLICATIONS

Porebski, J., "Occupancy Grid for Static Environment Perception in Series Automotive Applications", IFAC Papers Online, vol. 52, Issue 8, pp. 148-153, Jul. 2019.

Saval-Calvo, M., "A Review of the Bayesian Occupancy Filter", MDPI Sensors, Feb. 2017.

Xu, C., "MIMO Radar Transmit Signal Optimization for Target Localization Exploiting Prior Information", Computer Science, Information Theory, May 15, 2023.

Xu, F., "Transmit Beamspace DDMA Based Automotive MIMO Radar", IEEE Transactions on Vehicular Technology, vol. 71, No. 2, Feb. 2022.

Xu, Feng et al., "Transmit Beamspace DDMA Based Automotive MIMO Radar," IEEE Transactions on Vehicular Technology, Feb. 2022, vol. 71, No. 2, pp. 1669-1684, IEEE Transactions on Vehicular Technology.

Porebski, Jakub et al., "Occupancy grid for static environment perception in series automotive application", Science Direct, 2019, pp. 148-153, vol. 52, IFAC (International Federation of Automatic Control), papers online.

Saval-Calvo, Marcelo et al, "A Review of the Bayesian Occupancy Filter", Sensors. Feb. 10, 2017, pp. 1-18, 17, 344, MDPI, Basel, Switzerland.

Lee, G., Kwon et al., "Robust measurement validation for radar target tracking using prior information" IET Radar Sonar Navigation, 2019, pp. 1842-1849, vol. 13, Iss. 10, the Institution of Engineering and Technology.

Xu, Chan et al., "MIMO Radar Transmit Signal Optimization for Target Localization Exploiting Prior Information." 2023, 6 pages, Department of Electronic and Information Engineering, Hong Kong.

Li, Feng-Cong et al., "A waveform design method for suppressing range sidelobes in desired intervals", Signal Processing , vol. 96, Part B, 2014, pp. 203-211, Harbin Institute of Technology, China.

* cited by examiner

RADAR SYSTEM TRANSMITTER BEAMFORMING USING OCCUPANCY MAP DATA

TECHNICAL FIELD

The present disclosure is directed in general to radar systems and associated methods of operation. In one aspect, the present disclosure relates to a radar system configured to modulate a beamforming operation of radar signal transmitter based upon occupancy map data to improve radar system efficiency.

BACKGROUND

A radar system transmits an electromagnetic signal and receives back reflections of the transmitted signal. The time delay and/or time delay variation between the transmitted and received signals can be determined and used to calculate the distance and/or the speed of objects causing the reflections, respectively. For example, in automotive applications, automotive radar systems can be used to determine the distance and/or the speed of oncoming vehicles and other obstacles.

Automotive radar systems enable the implementation of advanced driver-assistance system (ADAS) functions that are likely to enable increasingly safe driving and, eventually, fully autonomous driving platforms. Such systems use radar systems as the primary sensor for ADAS operations.

Existing radar systems are configured to transmit radar signals at a fixed and maximal power level to support the detection of objects at a maximum range of interest. In addition to increasing the power consumption of the radar sensor, a side-effect of this behavior is it can result in elevated levels of radar-to-radar system interference.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
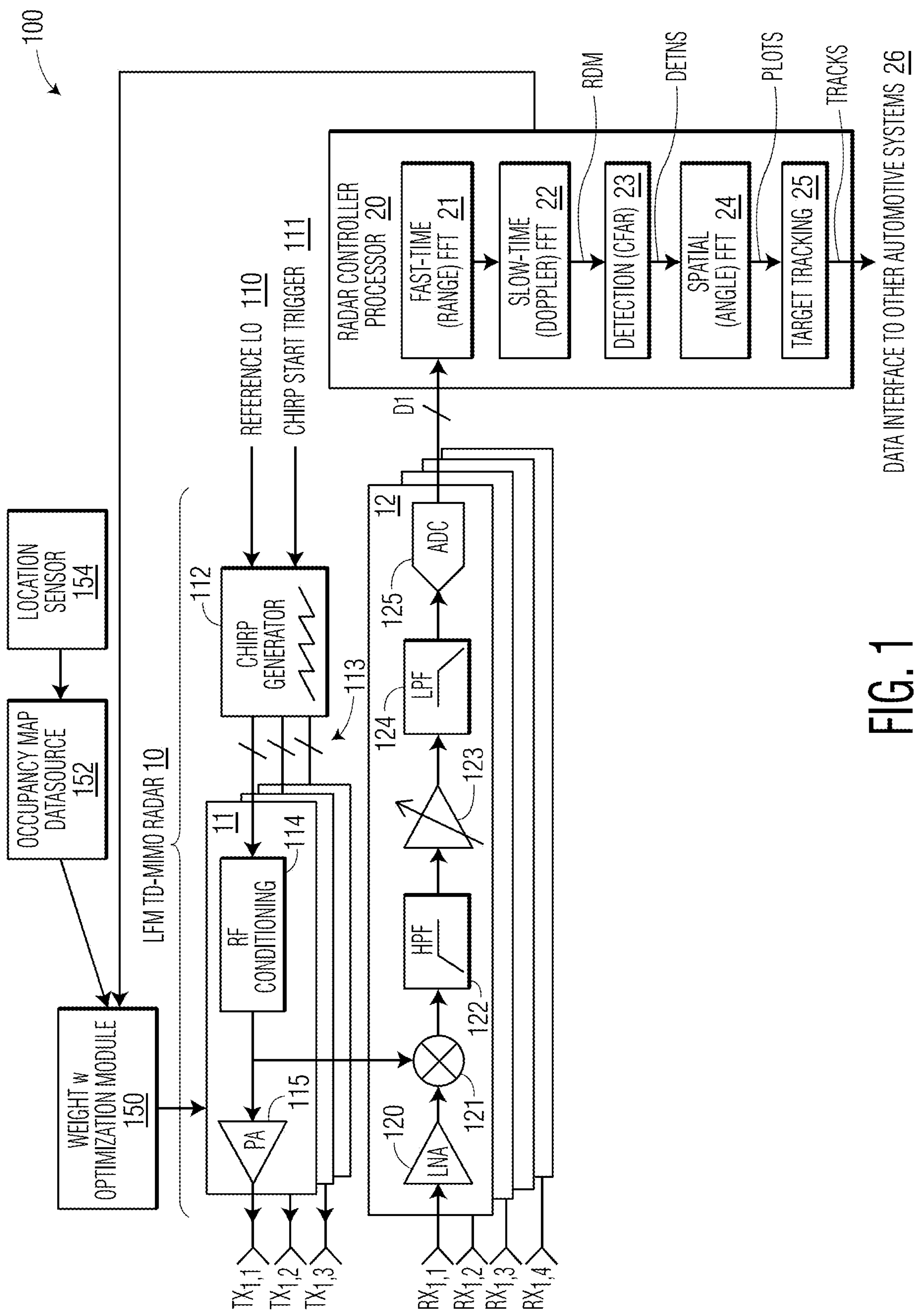
FIG. 1 depicts a block diagram of an automotive radar system configured in accordance with the present disclosure.

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

Automotive radar systems are used to support advanced driver-assistance system (ADAS) functions like assisted cruise control, emergency braking, and blind spot monitoring and alerts. For these ADAS applications, nearby objects that are detected by automotive radar systems are typically the most relevant. When executing emergency braking functions, for example, a nearby detected vehicle is more pertinent to the braking function than another vehicle that is a long way away.

In typical applications, conventional automotive radar systems are configured to transmit at maximum power levels to support object detection at the greatest possible object detection ranges (e.g., up to 200 m for long-range radars). As a consequence, existing automotive radar systems generally operate at maximum (or very high) power consumption levels. If all automotive radar systems in a particular geographical region (e.g., within a parking lot or on a particular section of road) are transmitting radar signal at maximum power levels, there is a significantly increased likelihood of system-to-system signal interference.

The present disclosure provides an automotive radar system and method that mitigates these deficiencies in existing automotive radar systems by providing an approach for adaptive beamforming of transmitted radar signals to enable more power efficient operations of automotive radar systems.

In the context of the present disclosure, it will be appreciated that radar systems may be used as sensors in a variety of different applications, including but not limited to automotive radar sensors for road safety and vehicle control systems, such as advanced driver-assistance systems (ADAS) and autonomous driving (AD) systems.

In such applications, the radar systems are used to measure the radial distance to a reflecting object, its relative radial velocity, and angle information, and are characterized by performance criteria, such as the angular resolution (the minimum distance between two equal large targets at the same range and range rate (or radial velocity) resolution cell which a radar is able to distinguish and separate to each other), sensitivity, false detection rate, and the like.

Typically, frequency modulated continuous wave (FMCW) modulation radars are used to identify the distance, velocity, and/or angle of a radar target, such as a car or pedestrian, by transmitting Linear Frequency Modulation (LFM) waveforms from transmit antennas so that reflected signals from the radar target are received at receive antennas and processed to determine the radial distance, relative radial velocity, and angle (or direction) for the radar target.

To illustrate the design and operation of a radar system configured in accordance with the present disclosure, reference is now made to FIG. 1 which depicts a simplified schematic block diagram of automotive radar system 100. Automotive radar system 100 may be co-located with a vehicle (e.g., an automobile) such that the components of radar system 100 are positioned on the same movable object or vehicle, such as within 3-4 feet of each other, or alternatively, within 6 inches of each other. Automotive radar system 100 includes MIMO radar device 10 connected to a radar controller processor 20, also referred to herein as a radar processor. In selected embodiments, MIMO radar device 10 may be embodied as a line-replaceable unit (LRU) or modular component that is designed to be replaced quickly at an operating location. Similarly, the radar controller processor 20 may be embodied as a line-replaceable unit (LRU) or modular component. Although a single or mono-static MIMO radar device 10 is shown, it will be appreciated that additional distributed radar devices may be used to form a distributed or multi-static radar. In addition, the depicted radar system 100 may be implemented in integrated circuit form with the LFM TD-MIMO radar device 10 and the radar controller processor 20 formed with separate integrated circuits or chips or with a single chip, depending on the application.

Each radar device 10 includes one or more transmitting antenna units TXi and receiving antenna units RXj connected, respectively, to one or more radio frequency (RF) transmitter (TX) units 11 and receiver (RX) units 12. For example, each radar device (e.g., 10) is shown as including individual antenna units (e.g., TX1,i, RX1.j) connected, respectively, to three transmitter units (e.g., 11) and four receiver units (e.g., 12), but these numbers are not limiting and other numbers are also possible, such as four transmitter units 11 and six receiver units 12, or a single transmitter module 11 and/or a single receiver units 12.

Each radar device 10 also includes a chirp generator 112 that is configured and connected to supply a chirp input signal to the transmitter units 11. To this end, the chirp generator 112 is connected to receive a separate and independent local oscillator (LO) signal 110 and a chirp start trigger signal 111, though delays are likely to be different due to the signal path differences and programmable digital delay elements in the signal paths. Chirp signals 113 are generated and transmitted to multiple transmitter units 11, usually following a pre-defined transmission schedule, where they are filtered at the RF conditioning module 114 and amplified at the power amplifier 115 before being fed to the corresponding transmit antenna TX1,i and radiated.

In some embodiments, the transmitter units 11 of radar system 100 may employ a phased antenna array architecture. In that case, the generated chirp signal is phase shifted and scaled at each transmitting element 11 independently via programmable phase shifters and amplitude controllers. The phase shifted and scaled chirp signals are radiated out of the various antenna units connected to the transmitter units 11.

The radar signal transmitted by the transmitter antenna unit TX1,i, TX2,i may be reflected by an object, and part of the reflected radar signal reaches the receiver antenna units RX1,i at the radar device 10. At each receiver module 12, the received (radio frequency) antenna signal is amplified by a low noise amplifier (LNA) 120 and then fed to a mixer 121 where it is mixed with the transmitted chirp signal generated by the RF conditioning module 114. The resulting intermediate frequency signal is fed to a first high-pass filter (HPF) 122. The resulting filtered signal is fed to a first variable gain amplifier 123 which amplifies the signal before feeding it to a first low pass filter (LPF) 124. This re-filtered signal is fed to an analog/digital converter (ADC) 125 and is output by each receiver module 12 as a digital signal D1. In various embodiments, the receiver module compresses target echoes of various delay signals into multiple sinusoidal tones whose frequencies correspond to the round-trip delay of the echo.

The radar system 100 also includes a radar controller processing unit 20 that is connected to supply input control signals to the radar device 10 and to receive therefrom digital output signals generated by the receiver units 12.

In selected embodiments, the radar controller processing unit 20 may be embodied as a micro-controller unit (MCU) or other processing unit that is configured and arranged for signal processing tasks such as, but not limited to, target identification, computation of target distance, target velocity, and target direction, and generating control signals. The radar controller processing unit 20 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences.

In addition, the radar controller processor 20 may be configured to program the transmitter units 11 to operate in a time-division fashion by sequentially transmitting LFM chirps for coordinated communication between the transmit antennas TX1,i, RX1,j. The result of the digital processing at the radar controller processing unit 20 is that the digital domain signals D1 are processed for the subsequent fast-time range frequency Fourier transform (FFT) 21, slow-time FFT 22 for Doppler compression, constant false alarm rate (CFAR) target detection 23, spatial angle estimation 24, and target tracking processes 25, with the result being output 26 to other automotive computing or user interfacing devices for further process or display. When performing target detection, the radar controller processor 20 is configured to determine a range profile of the reflected radar signals, where peaks in the range profile are indicative of potential targets at known ranges.

During operation of automotive radar system 100, radar controller processor 20 transmits control signals to the various components of one or more radio frequency (RF) transmitter (TX) units 11 and receiver (RX) units 12 to control how the radar signals transmitted by automotive radar system 100 are the transmitted signals are shaped and how the received signals are processed. In a specific example, radar controller processor 20 is configured to modulate the power level of signals transmitted by the one or more radio frequency (RF) transmitter (TX) units 11 by transmitting control signals to power amplifier 115 of each of the one or more radio frequency (RF) transmitter (TX) units 11.

In implementations of radar system 100 in which multiple transmitter units 11 and receiver units 12 are present (with corresponding transmit and receiver antennas $TX_{1.1}$-$TX_{1,N}$ and $RX_{1.1}$-$RX_{1,N}$, respectively), radar system 100 may be configured to utilize the multiple transmit and receiver antennas (e.g., as in a MIMO or phased array radar) to enable radar system 100 to implement beamforming, in which the signals transmitted by the radar system 100 can have different magnitudes in different directions. Beamforming, for example, can enable radar system 100 to transmit a radar signal that is stronger in the direction of the vehicle's travel direction, while having lower magnitudes in directions perpendicular to the vehicle's direction of travel.

In a typical implementation, beamforming is implemented by defining a set of weights (see weight optimization module 150 of system 100) to be applied to the signals being transmitted, simultaneously, from each of the transmit antennas $TX_{1.1}$-$TX_{1,N}$ of radar system 100. By applying appropriate weights (arranged in a beamforming weight vector w), the magnitude of the signal that results from the combination of the various transmitted signals can be controlled for different directions. The weight vector w stores values that determine the configuration of various hardware components of the transmitter units 11 of radar system 100 when a radar signal is being transmitted. As such, the beamforming weight vector w is used to determine the physical configuration of elements such as power amplifier, amplitude controllers, and/or adjustable phase shifters in a manner to achieve a particular beamforming configuration of the transmitted radar signal. In an embodiment, the weight vector w is a one-dimensional array that includes a number of values equal to the number of transmitters being used for beamforming within the radar system. The $i^{th}$ element of w, i.e., $w_i$, represents the weight applied at the $i^{th}$ transmit transmitter unit 11. This weight can be applied digitally in MIMO radar systems (e.g., via control signals transmitted by weight optimization module 150 to the power amplifiers 115 of transmitter units 11), or by using a combination of an amplitude controller and a phase shifter (not shown in FIG. 1) that are within the signal path of the transmitter units 11 of radar system 100 in an analog beamforming-based radar system. In the latter case, $w_i$ is achieved using an amplitude controller and arg $(w_i)$ is achieved using a phase shifter. The beamforming weights are applied to the transmit antenna array so that the output from the multiple antennas combines to enhance the total signal strength along certain directions. Consequently, the beamforming-based transmitter can electronically steer the radar signal beam without physical movement of the antenna system. The use of transmit beamforming can allow for better interference resilience and better power management at the radar. In a similar manner, the weight vector w generated by weight optimization module 150 enables radar system 100 to properly receive and process reflections of the transmitted signal received at the radar system 100's various receive antennas $RX_{1,1}$-$RX_{1,N}$. Once processed, the received radar reflection signals are processed to identify potential targets objects indicated by the reflection signals, as well as attributes (e.g., range or distance, velocity, angle) of those various target objects that are then passed to the vehicle's ADAS or other vehicle systems.

The field of vision (FOV) of radar system 100 is subdivided into a number of different regions or sectors, referred to herein as angle bins. In that case, the radar system 100 is configured to transmit radar signals into the various regions or sectors to identify attributes of potential target objects that may be present within each of the regions or sectors. In typical radar systems, the radar signal transmitted into each region or sector is transmitted at full power, enabling the largest possible range of target object detection in each region or sector. Because in conventional radar systems radar signals are transmitted at maximum signal power to provide the longest range of target object detection at all times, that mode of operation can lead to significant levels of intra radar system signal interference, as well as inefficient radar system operation.

To remedy these problems (and others), the radar system 100 of the present disclosure provides a vehicle radar system in which the radar system is configured to utilize beamforming operations via generation of appropriate beamforming weight vectors w within weight optimization module 150 to control or optimize radar signal transmission power levels based upon information contained within an occupancy map retrieved from occupancy map data source 152 that is made available to the radar system 100.

In an implementation, as illustrated in FIG. 1, occupancy map data is retrieved from an occupancy map data source 152. The occupancy map is a data structure that contains information describing known structures or objects (typically statical, but potentially including dynamic objects, too) that are in the vicinity of the vehicle (e.g., determine via location sensor 154, which may include a satellite-based location sensor) and, specifically, the vehicle's radar system. On a particular roadway, for example, the occupancy map may provide information as to the location of roadway guardrails that run along an edge of the roadway, the locations of buildings or other permanent structures such as bridges, tunnels, large geological formations (e.g., mountain sides or cliffs), significant vegetation (e.g., large trees), large pieces of road working equipment, or other street obstructions. More generally, an occupancy map is a data structure that describes the location of radar signal-blocking objects that are in the vicinity of the radar system. As such, the occupancy map can be thought of defining a space around the vehicle into which the vehicle may drive or maneuver (i.e., it is not valid for the vehicle to drive into or through the area designated by the occupancy map as contained radar signal-blocking objects, but the vehicle could drive into regions that do not contain such objects). In some cases, the occupancy map defines, for a number of sectors radiating from the radar system (e.g., angle bins), a distance or range to the nearest radar signal-blocking object. In still further cases, the occupancy map may define the probability or likelihood that a radar-blocking object is located at a particular location in the vicinity of the radar system.

Figure 3:
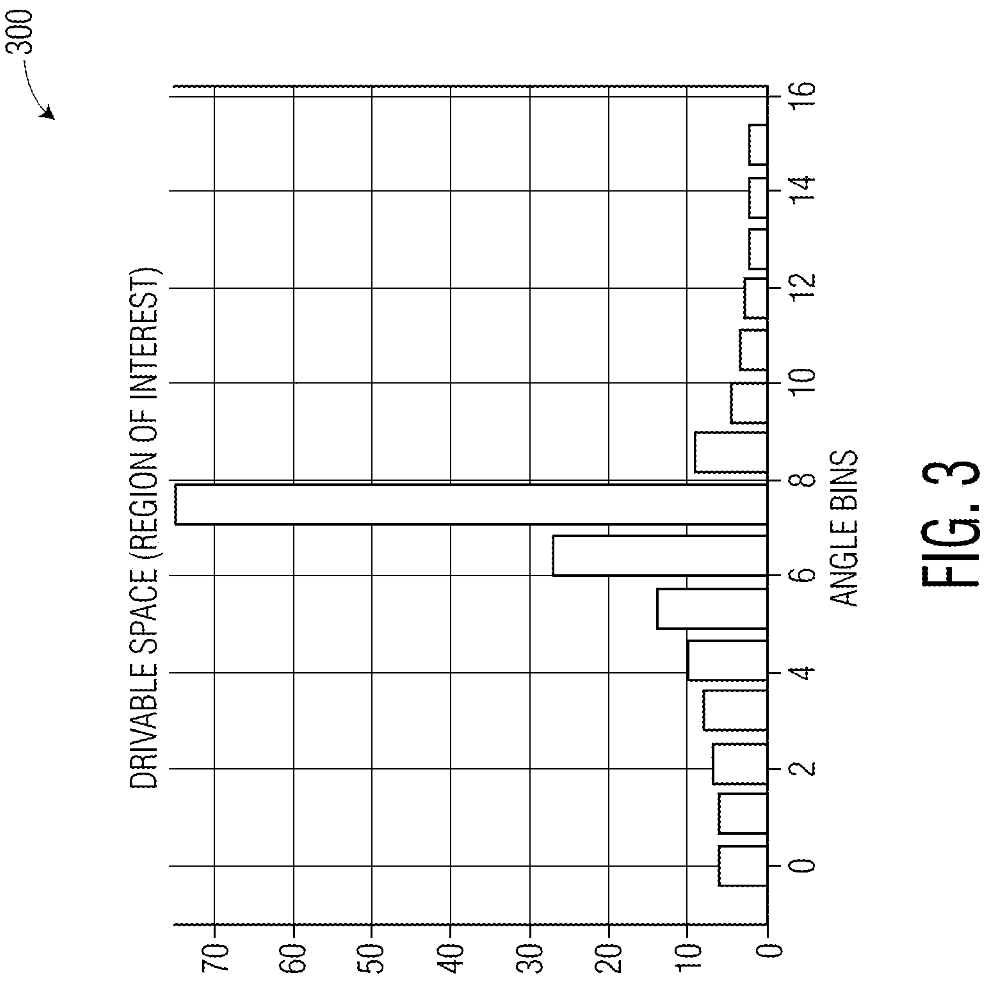
FIG. 3 depicts an occupancy map that may be generated for the portion of roadway shown in FIG. 2.
Figure 2:
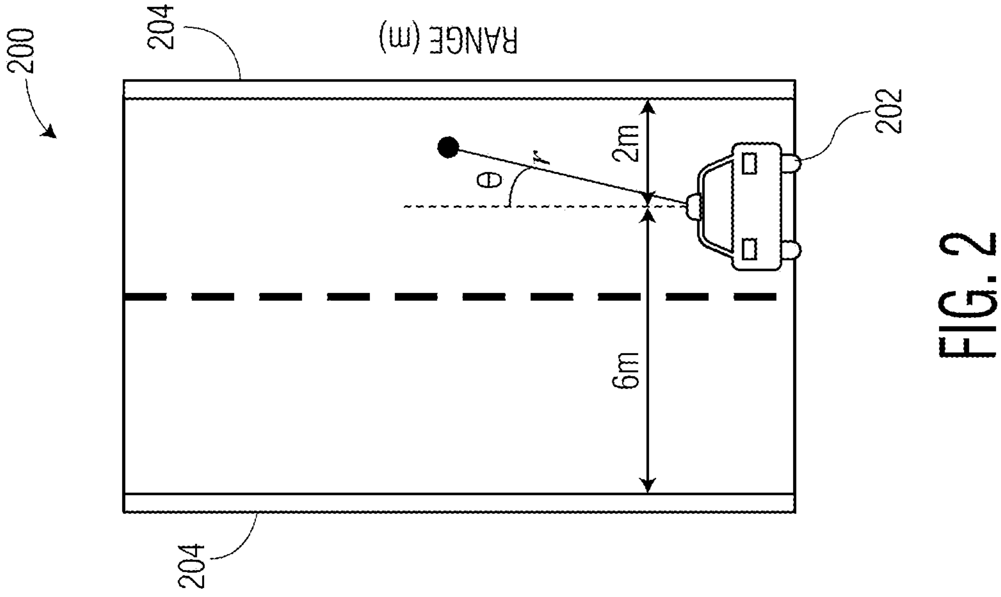
FIG. 2 depicts an example roadway scene.

To illustrate, FIG. 2 depicts an example roadway 200 and FIG. 3 depicts an occupancy map that may be generated for the portion of roadway 200 shown in FIG. 2. Within roadway 200, automobile 202 (containing a radar system) is positioned in the right-hand lane. Two guardrails 204 run a length of either side of roadway 200.

FIG. 3 depicts the occupancy map 300 of roadway 200. Occupancy map 300 is shown in the form of a bar chart. The horizontal axis of the bar chart represents the various angle bins of the radar system of vehicle 202, which each angle bin is associated with a particular sector of the FOV of the radar system. The angle bins shown in occupancy map 300 generally sweep from a left-most oriented sector (for the vehicle 202 shown in FIG. 2) to a right-most oriented sector. Within occupancy map 300, the vertical axis represents the distance into the particular sector defined by the corresponding angle bin at which a radar signal-blocking object is located or, alternatively, the distance the vehicle is eligible to drive in the direction associated with the corresponding angle bin.

As illustrated by occupancy map 300, for example, in the angle bins oriented towards the side of the radar system (e.g., angle bins 0 through 5 and 8 through 16), the distance to a radar signal-blocking object is relatively small due to the presence of guardrails 204. However, in front of the vehicle (represented by angle bins 6 and 7, for example), the occupancy map 300 indicates a larger distance to a radar signal-blocking object. This is accurate because, as illustrated by roadway 200, open roadway exists in front of the vehicle.

Figure 4:
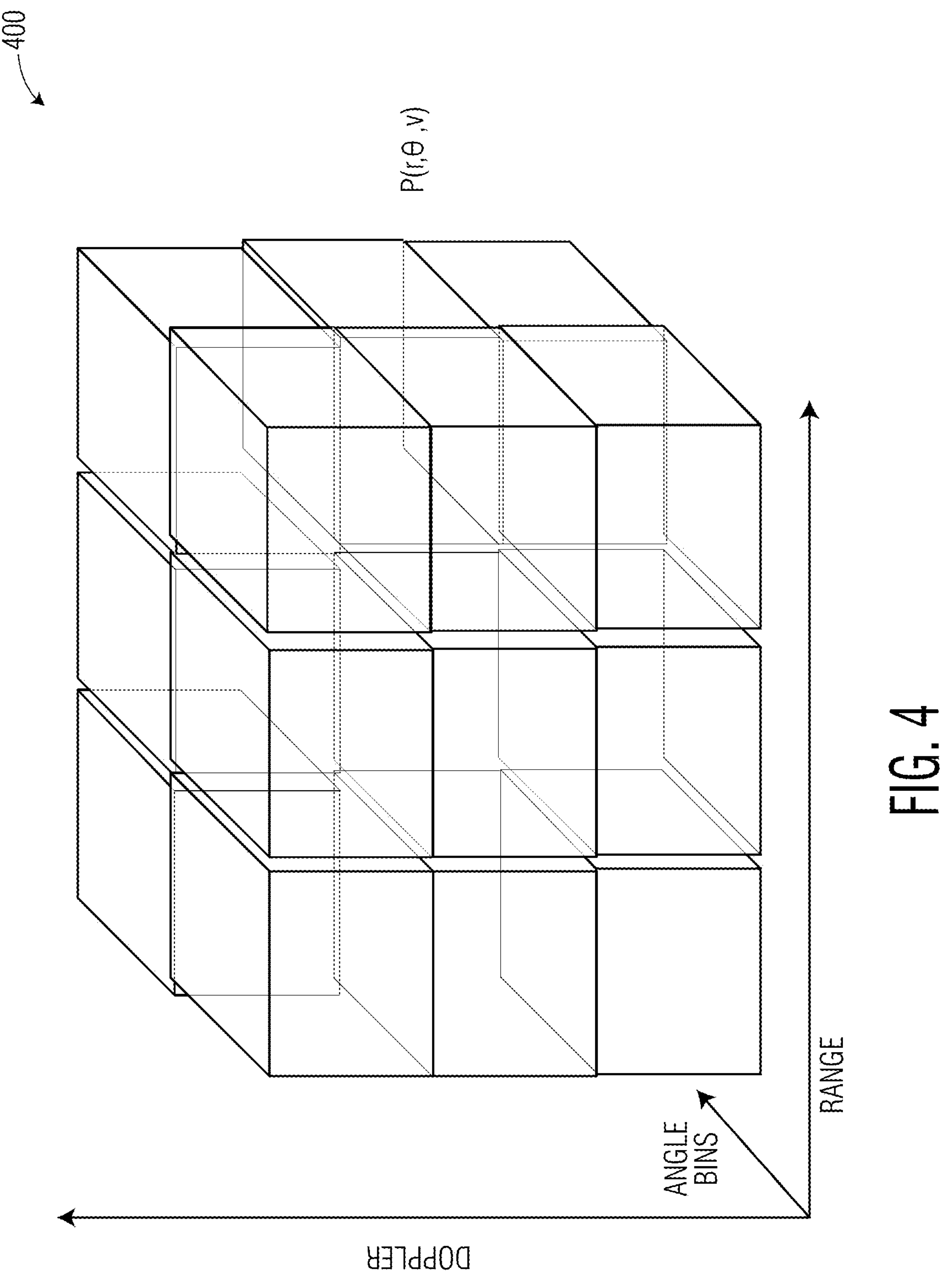
FIG. 4 depicts a probability-oriented occupancy map.

In other embodiments, an occupancy map can provide information regarding the likelihood or probability that a radar signal-blocking object occupies distinct locations in the space around a radar system. For example, FIG. 4 provides a visual depiction of another type of occupancy map that constitutes a probability-oriented occupancy map 400. Specifically, occupancy map 400 subdivides objects in the space around the radar system into a number of distinct generally cube-shaped regions. With reference to FIG. 4, the three-dimensional occupancy map 400 subdivides space based upon range or distance from the radar system (i.e., the horizontal axis), Doppler value characterizing object motion (more precisely, radial velocity towards the vehicle radar) (i.e., the vertical axis), and angle or angle bin of the radar system (i.e., the third axis that is oriented somewhat perpendicularly to the figure). Within occupancy map 400, each defined region (i.e., the various blocks shown in FIG. 4) are associated with a probability value (i.e., $\mathbb{P}$ (r, θ, v)) where the probability value indicates the likelihood that a radar signal-blocking object is located within that particular region. In a particular embodiment of occupancy map 400, the probability values may range from values of 0 to 1, where a value of 0 indicates absolute certainty that the region does not contain a radar-blocking object, a value of 1 indicates absolute certainty that the region includes a radar-blocking, and a probability value of 0.5 indicates absolute uncertainty as to whether that region includes a radar-blocking object.

Occupancy map data, in its various forms, as retrieved from occupancy map data source 152 can be generated using any suitable approach. In some implementations the occupancy map data can be generated by determining a location of the vehicle radar system by using a global positioning system (GPS) sensor or other global navigation satellite system (GNSS) to determine a location and an orientation of the vehicle. Based upon that information and known data regarding how the vehicle radar system is installed in the vehicle, the location and orientation of the vehicle radar system can be determined. With the location and orientation information known, object records databases (e.g., private or public databases that store information regarding locations of objects near roadways) can be accessed to build a listing of objects (and their respective locations) in the vicinity of the radar system or to otherwise define a region about the vehicle into which the vehicle can be driven. An occupancy map can then be generated accordingly. In other embodiments, occupancy maps can be generated in real-time based upon the target objects actively being detected and monitored by the vehicle radar system itself. In that case, the vehicle radar system may perform a scan of the vicinity of the vehicle (e.g., using maximum allowable power radar transmitted signals) to detect objects in the vicinity of the vehicle. Based upon a listing of detected objects and their respective ranges, angles, speed, and other attributes, an appropriate occupancy map can be generated. In that case, depending upon the outputs generated by the vehicle radar system's full power scan, the occupancy map may include probability data indicating the likelihood that objects are within particular regions of the space surrounding the vehicle.

In a specific embodiment, the occupancy map stored in occupancy map data source 152 may be generated by one or more of the following sources. One, using a mapping service that provides relative locations of static objects in the environment of the automotive. That mapping information may come from a geo-spatial map database that provides either a two-dimensional or a three-dimensional representation of the static object. Two, information on objects (static or dynamic) in the vicinity of the vehicle may come from an automotive or vehicle-based source. The automotive source may correspond to the ego-vehicle, or some other vehicle in the neighborhood. This information may be derived from a sensor such as a camera or a LiDAR (light detection and ranging). Three, the occupancy map may be from the automotive radar itself, based on prior measurements.

In typical radar systems, radar signals are always transmitted at a fixed power level in all directions from the radar system to achieve object detection at the radar system's maximum range of interest in all directions. This generally requires that radar signals always be transmitted at a maximum allowable power level in all directions. In addition to increasing the power consumption of a conventional radar system, a side-effect of this behavior is an increased likelihood of radar-to-radar system interference. If multiple radar systems are operating at maximum power levels in all directions within a constrained location, the radar signals transmitted by one such radar systems can overwhelm or otherwise interfere with the signals being received and processed by another nearby radar system.

In minimizing these deleterious effects, the present disclosure provides a radar system configured to perform radar signal beamforming in a manner that can optimize the power level of radar signals transmitted by the radar system in directions that are blocked by objects, increase the power level of radar signals in directions in which no such objects exist (or are likely to exist), while achieving adequate object detection performance. Accordingly, the present radar system is configured to increase the power of the transmitted radar signal in useful directions, while minimizing the power of radar signals transmitted in directions where less useful information can be learned.

In an embodiment, radar system 100 is configured to use the occupancy map data retrieved from occupancy map data source 152 as a control input to weight optimization module 150 to modify the radar system's beamforming weight vector w to control the power level of radar signal beams transmitted into the various angle bins of the radar system's FOV. Specifically, if the occupancy map indicates a radio-blocking object is present within one of the angle bins of the radar system, the weight optimization module 150 is configured to modify the beamforming weighting vector w to effectively reduce the power of the radar signal transmitted into the region defined by that angle bin such that the beamforming gain or beam pattern over that region results in an effective range which does not exceed the distance to the closest radio signal-blocking object.

In this manner, the occupancy map is used to define the geographical boundaries of a space around the radar system that is to be interrogated with radar signals in an attempt to identify target objects near the vehicle. Beamforming is utilized such that the power levels of transmitted radar signals are controlled so that the effect ranges of radar signals transmitted by the radar system do not exceed boundaries established by the occupancy map.

In an embodiment of the present system, a vehicle radar system has a FOV that is divided into a number of angle bins i. The radar system is configured to transmit radar signals in the directions associated with the angle bins i, where beams of the radar signals transmitted into different angle bins i are configured to detect target objects at particular ranges $r_i$. The radar system uses beamforming to determine the detection range $r_i$ of the various beams of the radar signals transmitted into the various angle bins i.

As described above, an occupancy map defines, for each angle bin i, a distance $d_i$ to a nearest radar signal-blocking object within that angle bin i. That distance $d_i$ is equivalent to the maximum allowable distance the vehicle can drive in the direction associated with the angle bin i. As such, the occupancy map defines the boundaries of a region around the vehicle radar system into which the vehicle can move.

That region, then, is to be analyzed by the radar system as the region may include objects that should be detected by the radar system. The space outside the boundaries of that region are, essentially, irrelevant to the radar system because the vehicle cannot move past those boundaries. To the extent the radar system transmits radar signals that penetrate beyond the boundaries set forth in the occupancy map, therefore, those signals represent wasted energy.

As such, radar system 100 is configured to transmit radar signals such that the effective range $r_i$ of the beams of the radar signal transmitted into each angle bin i is as large as possible, while not exceeding the distance $d_i$ for that particular angle bin i. as defined in the occupancy map. That is, a beamforming weight vector w is constructed such that for each angle bin i, $r_i <= d_i$.

The range constraint that $r_i <= d_i$ for all angle bins i can be applied to the beamforming weight vector w by weight optimization module 150 in the following manner using the radar equation.

The value $\zeta_{min}$, which represents the minimum signal-to-noise (SNR) ratio required to achieve a desired confidence level Pd for target objects at a distance of $r_i$, can be expressed as follows:

$$\zeta_{min} = \frac{P_{TX}|\alpha w^T a(\theta_i)|^2}{r_i^4 \sigma^2} \quad (1)$$

In equation (1), $P_{TX}$ represents the transmitted power, $\sigma^2$ represents the noise power, a is a term capturing the radar cross-section, wavelength and receiver antenna gain, $\alpha(\theta)$ represents the steering vector, w represents the beamforming weight vector.

Equation (1) can be rewritten to solve for the range value $r_i$, as follows, so that range $r_i$ is a function of the beamforming weight vector w:

$$r_i = \left( \frac{P_{TX}|\alpha|^2 |w^T a(\theta_i)|^2}{\zeta_{min} \sigma^2} \right)^{1/4} \quad (2)$$

As such, equation (2) expresses the range value $r_i$ as a function of the beamforming weight vector w.

Using equation (2), an optimization problem can be established that attempts to generate a weight vector w that maximizes the sum of the beamforming gains (see equation (3), below) such that the range values $r_i$ (expressed as a function of the weight vector w) for each angle bin I are less than the corresponding distance values $d_i$ determined by the occupancy map.

$$\max_w \sum_{i=1}^{N} \sqrt{|w^T a(\theta_i)|} \quad (3)$$

$$\left( \frac{P_{TX}|\alpha|^2 |w^T a(\theta_i)|^2}{\zeta_{min} \sigma^2} \right)^{1/4} < d_i \forall\, i \quad (4)$$

The optimization is further constrained such that the energy of the weight vector is constrained to unity, as shown in equation (5), below.

$$\|w\|_2 \leq 1 \quad (5)$$

The optimization problem established by the combination of equations 3, 4, and 5 is generally concave, such that the problem can be solved using conventional convex optimization tools (e.g., cvx-cvxr.com/cvx/). Once solved, the result of the optimization is a weight vector w that can be used to implement beamforming to control power levels and corresponding ranges of signals transmitted by the radar system within the regions of interest determined by the occupancy map.

Figures 5, 6:
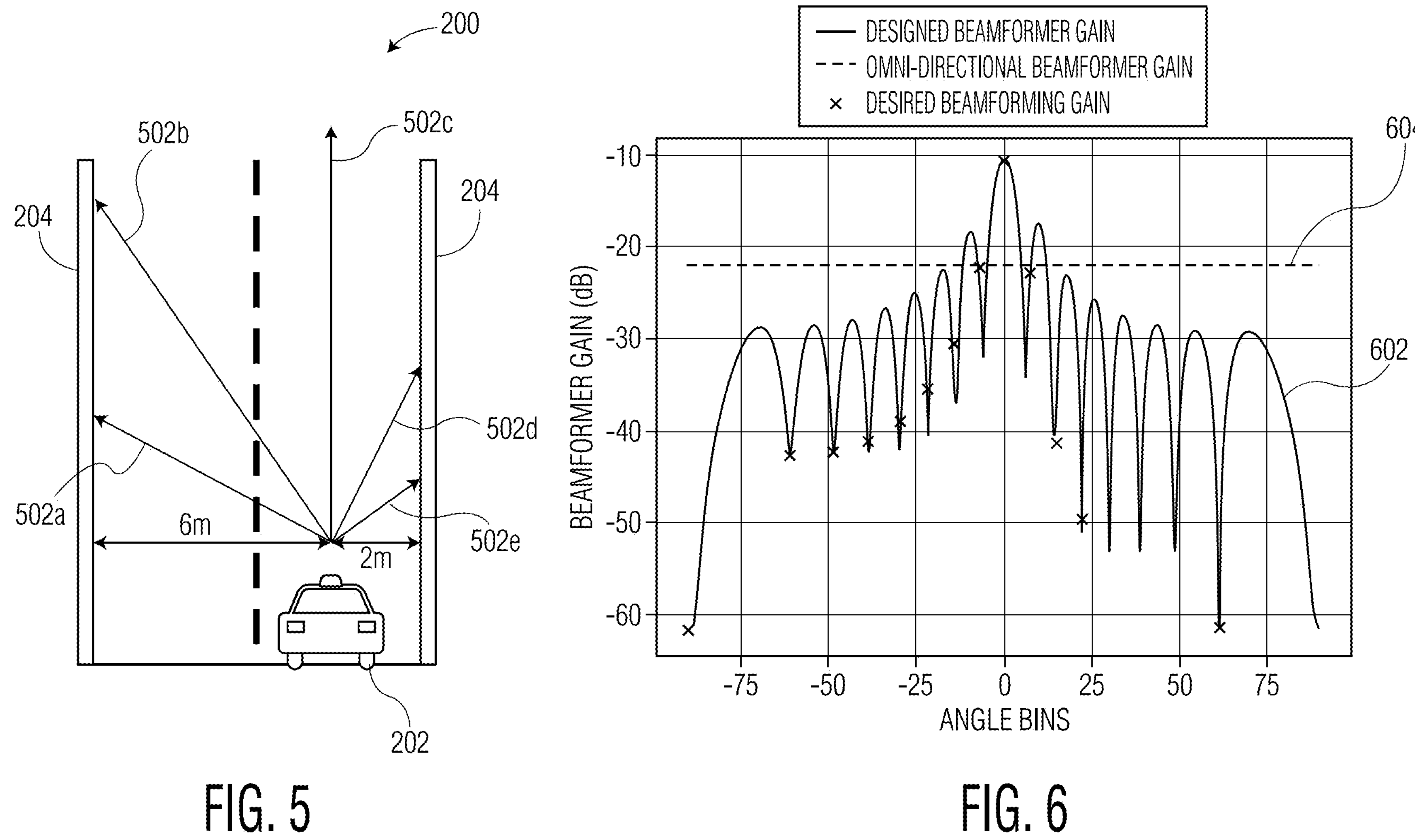
FIG. 5 depicts the roadway scene of FIG. 2 including arrows depicting portions or beams of a radar signal being transmitted into various angle bins of a radar system.
FIG. 6 is a chart depicting the gain of signals transmitted into the scene of the roadway pf FIG. 2 using a weight vector w optimized according to the present disclosure.

To illustrate, FIG. 5 depicts the roadway 200 of FIG. 2 including arrows 502 depict portions or beams of the beamformed radar signal being transmitted into the various angle bins of the radar system of vehicle 202. The lengths of each arrow 502 indicates the range $r_i$ of the corresponding portion of the radar signal. As depicted, the arrows 502 (i.e., arrows 502*a*, 502*b*, 502*d*, and 502*e*) represent beams of the radar signal transmitted to the left-side and right-side of the radar system and have lengths or ranges $r_i$ that only extend up to the radar signal-blocking objects (i.e., guardrails 204) present within the roadway 200. However, the arrow 502*c* associated with the beam of the radar signal transmitted into the angle bin directly in front of the radar system (in which there are no radar signal-block objects—a direction into which the vehicle can be driven any distance) has a significantly longer effective range $r_i$, corresponding to that portion of the signal having greater power.

FIG. 6 is a chart depicting the gain (trace 602) of signals transmitted into the scene of roadway 200 using a weight vector w optimized according to the method described above. Specifically, the horizontal axis of the chart of FIG. 6 represents the angle bins, while the vertical axis represents the gain of the transmitted radar signal at corresponding angles. As illustrated, the signal gain is greatest at angles around the central angle bin (i.e., at 0 degrees or directly forwards of the radar system). This high gain corresponds to the portion of the occupancy map of this example (depicted in FIG. 3) that indicates no radar signal-blocking objects at or near that central 0 degree angle. As such, the portion of the radar signal transmitted in that direction may have maximum (or greater) power than the remainder of the transmitted signal. At angles pointing away from that 0 degree angle (i.e., angles less than-15 degrees and angles greater than 15 degrees), the gain is reduced such that the range $r_i$ of the portions of the radar signal transmitted in those directions does not exceed the distance $d_i$ at which radar signal-blocking objects (e.g., guardrails) are present in the scene, in accordance with the occupancy map.

In the graph of FIG. 6, line 604 represents the gain of a conventional radar system approach in which beamforming is tailored to provide a constant gain across all angle bins of the radar system. In other words, the total power budget for transmitted signals in the conventional radar system is evenly distributed across all radar system directions—the same transmit power is used to transmit radar signals along the main roadway as signals transmitted directly into nearby guardrails. As such, this conventional approach exhibits significant inefficiencies in which the signal is too strong in directions the vehicle cannot travel, and too weak in directions into which the vehicle can travel.

As such, referring to FIG. 6, in the regions in which the gain of the conventional approach (line 604) exceeds the gain of the current approach (trace 602), that indicates regions where the conventional radar system is transmitting radar signals with effective ranges that are greater that the distance to radar signal-blocking objects that will block those radar signals. The additional energy of those signals is therefore wasted and can result in increased levels of signal interference without learning any useful information. Conversely, in the regions in which the gain of the conventional approach (line 604) falls below the gain of the current approach (trace 602), that indicates regions in which the usable range of the conventional approach falls below those of the present approach.

As described above, in some embodiments the occupancy map may provide information describing the probability that objects are located in particular regions of space about the vicinity of the vehicle (i.e., $\mathbb{P}$ (r, θ, v)).

As described above, such an occupancy map may be dynamic so that the occupancy map is periodically updated based upon the output of the vehicle radar system itself. Specifically, as the vehicle radar system detects new objects, new objects can be added to the occupancy map at a corresponding location. Or, more specifically, as the radar system detects target objects at particular locations (or fails to detect targets at particular locations) the probability values for those locations within the occupancy map can be updated. Examples of dynamic objects that may be represented in such an occupancy map include pedestrians, cyclists, other vehicles or automotive objects.

Using such a probability-based occupancy map, a different beamforming weight vector w optimization problem can be defined, in which the optimized weight vector w is configured to reduce the power level of signals (or portions of signals) transmitted into regions having either very high probability values closer to '1' (i.e., indicating that there is a high certainty of a radar-signal blocking object) or very low probability values closer to '0' (i.e., indicating that there is certainty that a radar-signal blocking object is not present). In contrast, the optimized weight vector w is configured to increase the power level of signals (or portions of signals) transmitted into regions with probability values closer to '0.5' where there is significant uncertainty as to whether or not an object is present.

In an embodiment, this optimization problem may be expressed as in equation (6), below.

$$\max \sum_{m=1}^{N_D} \sum_{i=1}^{N} \sum_{k=1}^{N_R} H(\mathbb{P}(r_k, \theta_i, v_m)) P_d(r_k, \theta_i, v_m) \quad (6)$$

In equation (6), $N_D$ is the number of Doppler bins, where N is the number of angle bins, $N_R$ is the number of range bins, His a function representing a measure of uncertainty such as the entropy function.

Within equation (6), the probability function Pa ( ) may be in the form of equation (7), below.

$$P_d(r, \theta, v) = Q\left(Q^{-1}(P_{FA}) - \sqrt{\frac{P_{TX}\left|\alpha w^T a(\theta)\right|^2}{r^4\sigma^2}}\right) \quad (7)$$

The optimization is further constrained by the requirement that the energy of the weight vector is constrained to unity as expressed by equation (8), below.

$$\|w\|_2 \leq 1 \quad (8)$$

The constrained optimization problem established by equations 6, 7, and 8 can be solved using methods such as projected gradient ascent algorithms. To solve the problem, we adopt a simple projected gradient ascent-based approach to arrive at a locally optimal solution. In each iteration of this method, the gradient of the cost function is computed. Subsequently, the beamformer is updated in the direction of the gradient and the resultant vector is projected onto the unit $\ell$ 2 ball. These steps are repeated until the beamformer converges to a stationary point or when the number of iterations exceeds a predefined limit.

Using this approach, a beamforming weight vector w is configured by weight optimization module 150 to generate a radar signal, wherein portions of the signal transmitted into regions associated with high confidence that an object is either present or non-present have higher signal magnitudes than portions of the signal transmitted into regions associated with low confidence that an object is either present or non-present (as determined by the corresponding occupancy map).

Figure 7:
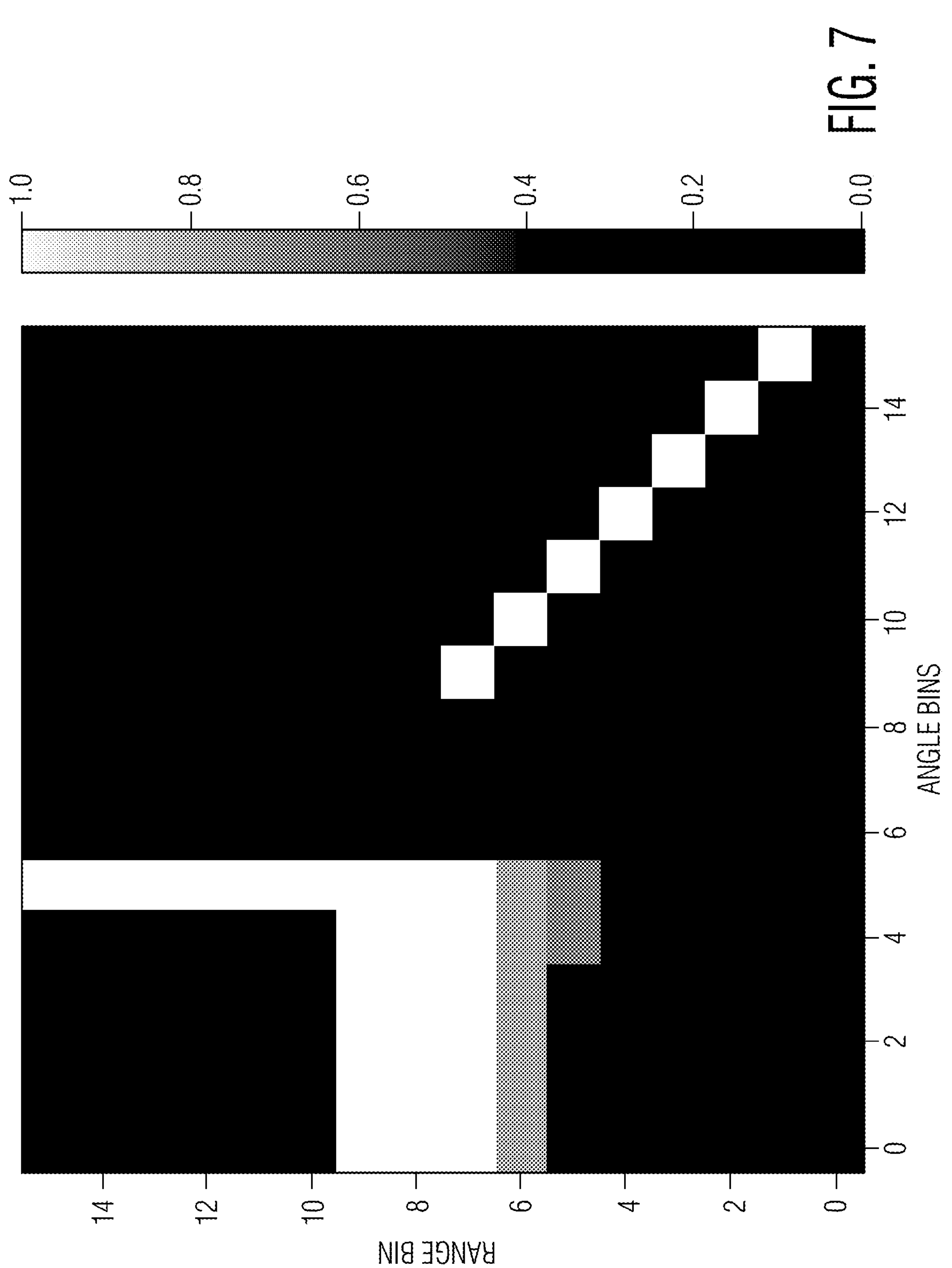
FIG. 7 is a chart depicting a two-dimensional probability-based occupancy map.

To illustrate, FIG. 7 is a chart depicting a two-dimensional probability-based occupancy map. In FIG. 7, the horizontal axis represents angle bin (e.g., direction), while the vertical axis represents range. The shading of each region of the occupancy map represents the probability value for that region of the occupancy map.

Using the occupancy map of FIG. 7, a beamforming weight vector w can be constructed (e.g., by optimizing the expression of equation (7)) such that the radar signal transmitted using the optimized weight vector w has greater signal power in regions having low certainty, and less magnitude in regions have high certainty.

Figure 8:
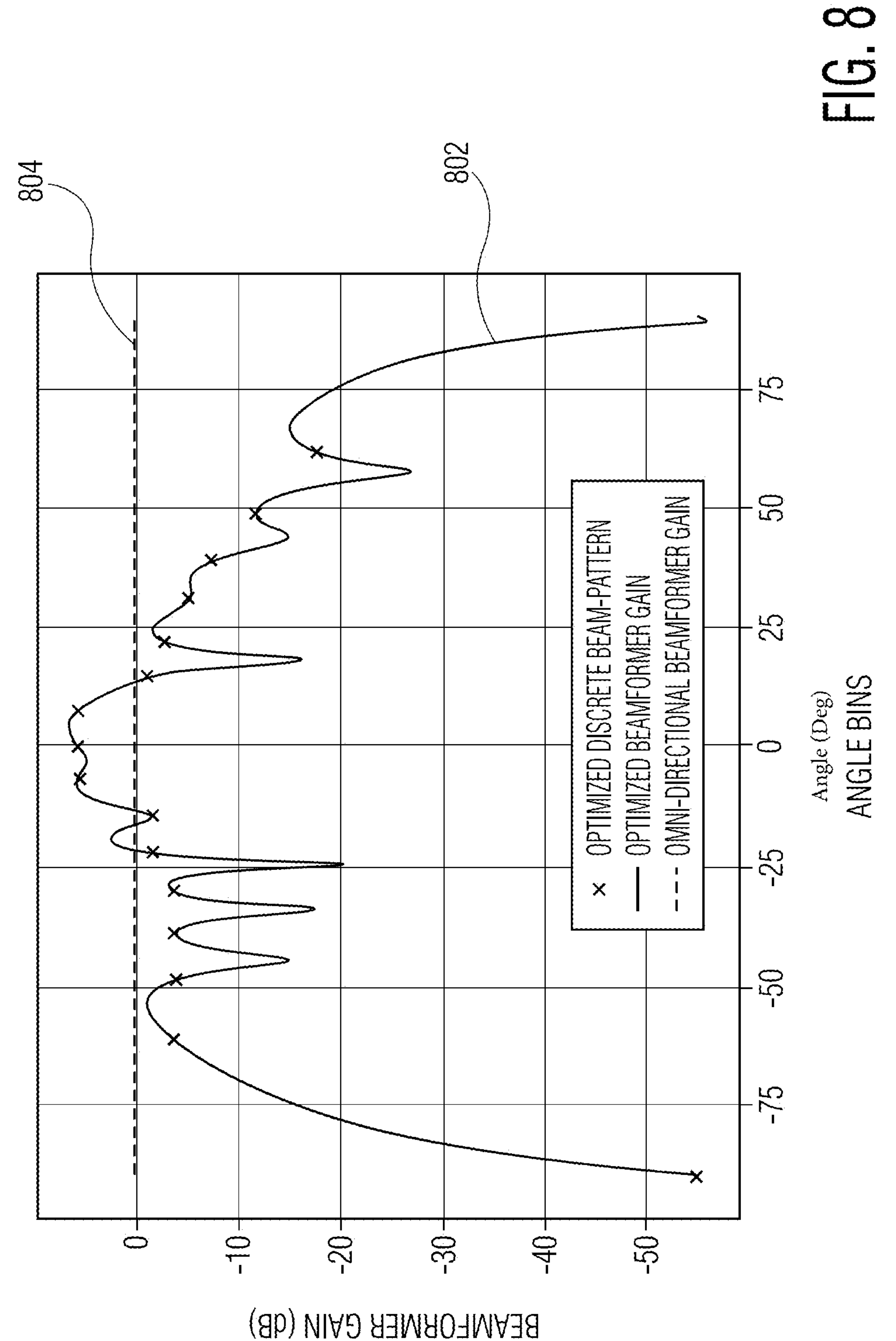
FIG. 8 is a graph depicting a gain profile of a radar signal, wherein the gain profile has been generated using an optimized beamforming weight vector w based upon the occupancy map of FIG. 7.

For example, FIG. 8 is a graph depicting the gain (trace 802) of a radar signal, wherein the gain profile has been generated using an optimized beamforming weight vector w based upon the occupancy map of FIG. 7. Specifically, the horizontal axis of the chart of FIG. 8 represents angle bins, while the vertical axis represents the gain of the transmitted radar signal at corresponding angle bins. As illustrated, the signal gain is greatest at angles around the central angle bin (i.e., at 0 degrees or directly forwards of the radar system). This high gain region corresponds to the region of the occupancy map with the highest uncertainty (i.e., probability values at or about 0.5, in this example). Conversely, at angles pointing away from that central angle (i.e., angles less than-15 degrees and angles greater than 15 degrees) the gain is reduced, which corresponds with those regions of the occupancy map that much lower uncertainty (e.g., probability values closers to 0 or 1, in this example).

In the graph of FIG. 8, line 804 represents the gain of a conventional radar system approach in which beamforming is tailored to provide a constant gain across all angle bins of the radar system. In other words, the total power budget for transmitted signals in the conventional radar system is evenly distributed across signals transmitted in all directions—the same transmit power is used to transmit radar signals along the main roadway as signals transmitted directly into nearby guardrails. As such, this conventional approach exhibits significant inefficiencies by transmitting high power radar signals into areas in which the system already has certainty as to whether objects are present or not present due to the occupancy map.

Figure 9:
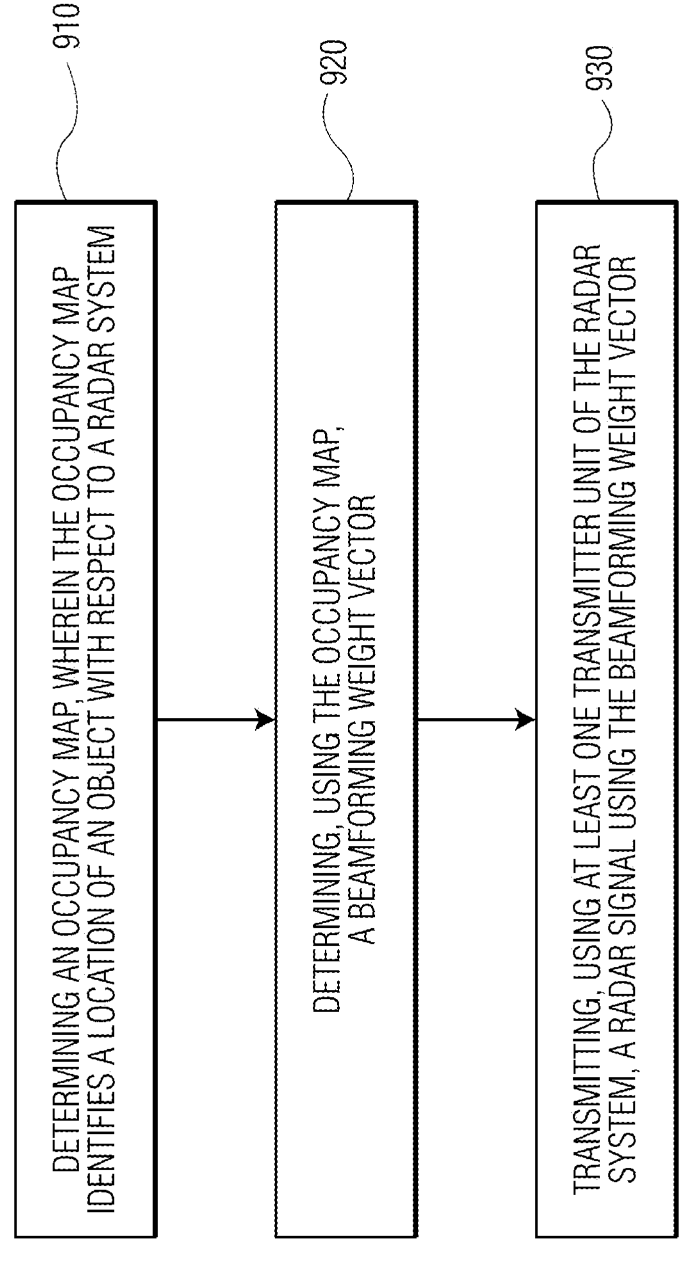
FIG. 9 is a flowchart of an example method transmitting a radar signal where a beamforming gain of the radar system is determined by a beamforming weight vector w that has been at least partially determined by an occupancy map, in accordance with the present disclosure.

FIG. 9 is a flowchart of an example method transmitting a radar signal where a beamforming gain of the radar system is determined by a beamforming weight vector w that has been at least partially determined by an occupancy map, in accordance with the present disclosure. The method may be performed, for example, by radar system 100 of FIG. 1 or another similarly configured radar system. Specific steps of the method may be implemented by various controllers or processors (e.g., radar controller processor 20 of FIG. 1), functional modules (e.g., weight optimization module 150) in communication with other system components (e.g., transmitter units 11, receiver units 12, and, optionally, occupancy map data source 152 of FIG. 1). At step 910, an occupancy map is determined. As described herein, the occupancy map identifies a location of an object with respect to a radar system. A beamforming weight vector is then determined at step 920 using the occupancy map. Various approaches for determining such a beamforming weight vector are described herein. With the beamforming weight vector determined, at step 930, using at least one transmitter unit of the radar system, a radar signal is transmitted using the beamforming weight vector.

Clause 1. An automotive radar system, comprising: at least one transmitter unit and at least one receiver unit, wherein the at least one transmitter unit and the at least one receiver unit are configured to transmit and receive radar signals, wherein the at least one transmitter unit and the at least one receiver unit are co-located with a vehicle; and a radar processor, configured to: determine an occupancy map, wherein the occupancy map identifies a location of an object with respect to the automotive radar system, determine, using the occupancy map, a beamforming weight vector w, and transmit, using the at least one transmitter unit, the radar signal using the beamforming weight vector w.

Clause 2. The automotive radar system of clause 1, wherein the beamforming weight vector w is configured to enable a determination of a gain of the radar signal, wherein the gain is at least partially determined by a probability value associated with the object in the occupancy map.

Clause 3. The automotive radar system of clause 1, wherein the beamforming weight vector w is configured to enable a determination of a beam of the radar signal has an effective range that is less than or equal to a distance between the automotive radar system and the object.

Clause 4. The automotive radar system of clause 1, wherein the radar processor is configured to determine the occupancy map by: determining a location of the automotive radar system; and accessing a database storing locations of a plurality of objects to identify the object, wherein the location of the object is within a threshold distance of the location of the automotive radar system.

Clause 5. The automotive radar system of clause 1, wherein the radar processor is configured to determine the occupancy map by: receiving, using the at least one receiver unit, a received radar signal; processing the received radar signal to identify a target object and a range to the target object; and determine the occupancy map using the range to the target object.

Clause 6. The automotive radar system of clause 1, wherein a field of vision of the automotive radar system is divided into a plurality of angle bins and the occupancy map defines distance values in association with angle bins of the plurality of angle bins.

Clause 7. The automotive radar system of clause 6, wherein the radar processor is configured to determine the beamforming weight vector w by determining a maximum value of the weight vector w that satisfies a requirement that an effective range of beams of the radar signal transmitted into each angle bin do not exceed the distance values associated with the same angle bin in the occupancy map.

Clause 8. The automotive radar system of clause 1, wherein the occupancy map associates a probability value with the location of the object.

Clause 9. The automotive radar system of clause 1, wherein the object includes at least one of a static object and a dynamic object, wherein the static object may be an object selected from a guardrail, a building, a street obstruction, and a vegetation, and the dynamic object may be an object selected from a pedestrian, a cyclist, an automobile, and another type of moving vehicle.

Clause 10. A system, comprising: at least one transmitter unit and at least one receiver unit; and a controller, configured to: determine an occupancy map, wherein the occupancy map identifies a location and a probability value associated with the location, determine, using the occupancy map, a beamforming weight vector, wherein the beamforming weight vector is configured to enable a determination of a gain of a radar signal, wherein the gain is at least partially determined by the probability value associated with the location in the occupancy map, and transmit, using the at least one transmitter unit, the radar signal using the beamforming weight vector.

Clause 11. The system of clause 10, wherein the beamforming weight vector is configured to enable a determination of an effective range of a beam of the radar signal that is less than or equal to a value determined by the location in the occupancy map.

Clause 12. The system of clause 10, wherein the controller is configured to determine the occupancy map by: determining a location of a radar system; and accessing a database storing locations of a plurality of objects to identify the object, wherein the location of the object is within a threshold distance of the location of the radar system.

Clause 13. The system of clause 10, wherein the controller is configured to determine the occupancy map by: processing a received radar signal to identify a target object and a range to the target object; and determine the occupancy map using the range of the target object.

Clause 14. A method, comprising: determining an occupancy map, wherein the occupancy map identifies a location of an object with respect to a radar system; determining, using the occupancy map, a beamforming weight vector; and transmitting, using at least one transmitter unit of the radar system, a radar signal using the beamforming weight vector.

Clause 15. The method of clause 14, wherein determining the beamforming weight vector further comprises determining the beamforming weight vector using a probability value associated with the object in the occupancy map.

Clause 16. The method of clause 14, further comprising determining the occupancy map by: determining a location of the radar system; and accessing a database storing locations of a plurality of objects to identify an object associated with the location.

Clause 17. The method of clause 14, further comprising determining the occupancy map by: receiving a received radar signal; processing the received radar signal to identify a target object and a range to the target object; and determining the occupancy map using the range to the target object.

Clause 18. The method of clause 14, wherein a field of vision of the radar system is divided into a plurality of angle bins and the occupancy map defines distance values in association with angle bins of the plurality of angle bins.

Clause 19. The method of clause 18, further comprising determining the beamforming weight vector by determining a maximum value of the weight vector that satisfies a requirement that an effective range of signals transmitted into each angle bin using the weight vector do not exceed the distance value associated with the same angle bin in the occupancy map.

Clause 20. The method of clause 14, wherein transmitting the radar signal further comprising setting a configuration of a power amplifier in the at least one transmitter unit using the beamforming weight vector.

Although the examples have been described with reference to automotive radar systems, the systems and methods described herein may be implemented in conjunction with other types of radar systems.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automotive radar system, comprising:

at least one transmitter unit and at least one receiver unit, wherein the at least one transmitter unit and the at least one receiver unit are configured to transmit and receive radar signals, wherein the at least one transmitter unit and the at least one receiver unit are co-located with a vehicle; and a radar processor, configured to:

determine an occupancy map, wherein the occupancy map identifies a location of an object with respect to the automotive radar system and a probability value associated with the location of the object in the occupancy map, determine, using the occupancy map, a beamforming weight vector w, wherein the beamforming weight vector w is configured to enable determination of a gain of the radar signal and the gain of the radar signal is at least partially determined by the probability value associated with the location, by optimizing the beamforming weight vector w so that radar signals transmitted to the location have a first gain when the probability value has a first probability value and a second gain when the probability value has a second probability value, wherein the first gain is greater than the second gain when the first probability value indicates higher uncertainty than the second probability value, and transmit, using the at least one transmitter unit, the radar signal using the beamforming weight vector w.

2. The automotive radar system of claim 1, wherein the beamforming weight vector w is configured to enable a determination of a beam of the radar signal has an effective range that is less than or equal to a distance between the automotive radar system and the object.

3. The automotive radar system of claim 1, wherein the radar processor is configured to determine the occupancy map by:

determining a location of the automotive radar system; and accessing a database storing locations of a plurality of objects to identify the object, wherein the location of the object is within a threshold distance of the location of the automotive radar system.

4. The automotive radar system of claim 1, wherein the radar processor is configured to determine the occupancy map by:

receiving, using the at least one receiver unit, a received radar signal;

processing the received radar signal to identify a target object and a range to the target object; and determine the occupancy map using the range to the target object.

5. The automotive radar system of claim 1, wherein a field of vision of the automotive radar system is divided into a plurality of angle bins and the occupancy map defines distance values in association with angle bins of the plurality of angle bins.

6. The automotive radar system of claim 5, wherein the radar processor is configured to determine the beamforming weight vector w by determining a maximum value of the weight vector w that satisfies a requirement that an effective range of beams of the radar signal transmitted into each angle bin do not exceed the distance values associated with the same angle bin in the occupancy map.

7. The automotive radar system of claim 1, wherein the occupancy map associates a probability value with the location of the object.

8. The automotive radar system of claim 1, wherein the object includes at least one of a static object and a dynamic object, wherein the static object may be an object selected from a guardrail, a building, a street obstruction, and a vegetation, and the dynamic object may be an object selected from a pedestrian, a cyclist, an automobile, and another type of moving vehicle.

9. A system, comprising:

at least one transmitter unit and at least one receiver unit; and a controller, configured to:

determine an occupancy map, wherein the occupancy map identifies a location and a probability value associated with the location, determine, using the occupancy map, a beamforming weight vector, wherein the beamforming weight vector is configured to enable a determination of a gain of a radar signal, wherein the gain is at least partially determined by the probability value associated with the location in the occupancy map, by optimizing the beamforming weight vector so that radar signals transmitted to the location have a first gain when the probability value has a first probability value and a second gain when the probability value has a second probability value, wherein the first gain is greater than the second gain when the first probability value indicates higher uncertainty than the second probability value, and transmit, using the at least one transmitter unit, the radar signal using the beamforming weight vector.

10. The system of claim 9, wherein the beamforming weight vector is configured to enable a determination of an effective range of a beam of the radar signal that is less than or equal to a value determined by the location in the occupancy map.

11. The system of claim 9, wherein the controller is configured to determine the occupancy map by:

determining a location of a radar system; and accessing a database storing locations of a plurality of objects to identify the object, wherein the location of the object is within a threshold distance of the location of the radar system.

12. The system of claim 9, wherein the controller is configured to determine the occupancy map by:

processing a received radar signal to identify a target object and a range to the target object; and determine the occupancy map using the range of the target object.

13. A method, comprising:

determining an occupancy map, wherein the occupancy map identifies a location of an object with respect to a radar system and a probability value associated with the object;

determining, using the occupancy map, a beamforming weight vector, wherein the beamforming weight vector is configured to enable a determination of a gain of a radar signal, wherein the gain is at least partially determined by the probability value associated with the location in the occupancy map, by optimizing the beamforming weight vector so that radar signals transmitted to the location have a first gain when the probability value has a first probability value and a second gain when the probability value has a second probability value, wherein the first gain is greater than the second gain when the first probability value indicates higher uncertainty than the second probability value; and transmitting, using at least one transmitter unit of the radar system, a radar signal using the beamforming weight vector, wherein a gain of the radar signal is at least partially determined by the probability value.

14. The method of claim 13, further comprising determining the occupancy map by:

determining a location of the radar system; and accessing a database storing locations of a plurality of objects to identify an object associated with the location.

15. The method of claim 13, further comprising determining the occupancy map by:

receiving a received radar signal;

processing the received radar signal to identify a target object and a range to the target object; and determining the occupancy map using the range to the target object.

16. The method of claim 13, wherein a field of vision of the radar system is divided into a plurality of angle bins and the occupancy map defines distance values in association with angle bins of the plurality of angle bins.

17. The method of claim 16, further comprising determining the beamforming weight vector by determining a maximum value of the weight vector that satisfies a requirement that an effective range of signals transmitted into each angle bin using the weight vector do not exceed the distance value associated with the same angle bin in the occupancy map.

18. The method of claim 13, wherein transmitting the radar signal further comprising setting a configuration of a power amplifier in the at least one transmitter unit using the beamforming weight vector.

* * * * *